Dec. 7, 1954   L. M. CRAIG ET AL   2,696,362
SLIDE VALVE ADAPTED FOR CONTROLLING FLUIDIZED SOLIDS FLOW
Filed May 26, 1949

Lester M. Craig  Inventors
Cecil D. Bush
By W. O. Heilman Attorney

United States Patent Office 2,696,362
Patented Dec. 7, 1954

2,696,362

SLIDE VALVE ADAPTED FOR CONTROLLING FLUIDIZED SOLIDS FLOW

Lester M. Craig and Cecil D. Bush, Baton Rouge, La., assignors to Standard Oil Development Company, a corporation of Delaware Application May 26, 1949, Serial No. 95,396

1 Claim. (Cl. 251—205)

This invention relates to a novel type of slide valve particularly adapted for controlling the flow of finely divided solids. In accordance with this invention a slide valve is disclosed of such a nature that, as one area of the valve slide becomes eroded by the passage of solids, the slide may be moved to a new position in which a new uneroded surface may be utilized.

At the present time in the chemical industry generally, and in the petroleum refinery industry particularly, a great many processes are being introduced which employ the so-called "fluidized solids technique." In these processes solid particles of catalysts or solid particles of heat exchange media or solid particles of reactants are subjected to the flow of a critical amount of gas. Under the proper conditions, it is possible to cause the gas flowing through the particles of solids to fluidize the solids so as to impart to the system the general characteristics of a liquid. Thus, a bed of fluidized solids may be maintained having a level, having the flow and hydrostatic properties of a liquid, and characterized by a turbulent movement of the solids throughout the bed of material. In appearance, a fluidized bed of solids closely resembles a boiling liquid.

In conducting a process utilizing this general technique, it is generally necessary to pass the fluidized solids through various processing lines, the flow of which is controlled by suitable valves. In general the valves which have been employed to control the flow of fluidized solids are of the type known as "slide valves." These valves are equipped with an orifice plate positioned adjacent a movable slide adapted to partially or completely close the orifice on movement of the slide. One of the principal problems in successfully operating fluidized solids processes is connected with the provision and maintenance of the slide valves employed. By its nature a flow of fluidized solids is well adapted to cause severe erosion of any obstructions in a flow line. Thus the rapidly moving particles which make up the fluidized stream tend to severely cut away or erode valves used to control their flow. It is therefore the principal object of this invention to provide an improved type of slide valve adapted for use in controlling a flow of fluidized solids but of such a nature that erosion of the valve will not affect the operability of the valve and will not necessitate replacement of the valve.

It is a further object of this invention to provide a slide valve which at all times, regardless of the erosion it may have undergone, will be capable of completely closing off a flow of fluidized solids through the valve.

In accordance with this invention a new type of slide valve is disclosed employing an orifice plate having a single elongated opening or two or more openings, through which fluidized solids may flow. The single elongated opening or the plurality of openings are arranged in what may be described as a staggered position so that a slide moving across the orifice plate closes the opening or openings with different surfaces of the slide. By virtue of this arrangement, as erosion of the slide becomes extensive at one portion thereof, the slide may be advanced so as to control passage of solids by utilization of a new and formerly unexposed portion of the valve slide. The nature of this valve may be clearly understood by reference to the accompanying drawing in which:

Figure 1 shows an elevational cross section view of one embodiment of the invention utilizing three orifices arranged on a diagonal of the orifice plate and in which:

Figure 2 shows a plan view of the valve of this invention and in which:

Figure 3 illustrates a somewhat different embodiment of the invention utilizing three orifices arranged in an alternative fashion and in which:

Figure 1:
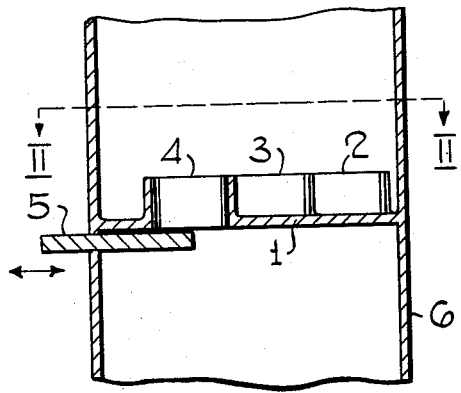
Figure 2:
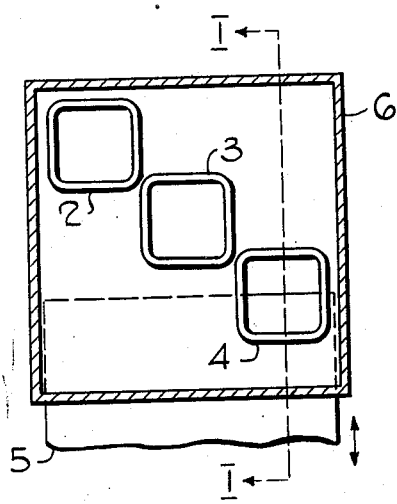

Referring now to Figures 1 and 2, a valve embodying this invention is diagrammatically illustrated. As shown, the valve comprises a square orifice plate 1 having three orifices 2, 3, 4 arranged on a diagonal of the orifice plate. The plate is positioned directly above and in juxtaposition with a valve slide 5 maintained in slidable relationship with the orifice plate. It is to be understood that the orifiice plate 1 is to be fixed in a line 6 so as to be substantially perpendicular to the axis of the line, and so as to completely close the line with the exception of the open orifices 2, 3, and 4. Practically this may best be accomplished by providing the orifice plate holes adjacent its edges so it can be directly coupled into a line between suitable flanges. Suitable guides are also positioned in the line for holding the valve slide in the desired position. Consequently by moving the valve slide 5, this slide may be moved across the orifices to partially or completely close them as desired. Insofar as the manner in which slide valves are fitted in a line, is no part of this invention and is well known to the art, no further description will be made of the manner in which the valve is actually assembled in a line of fluidized solid particles. Similarly the materials of construction used may be chosen from those commonly used for slide valve construction, for example, carbon steel.

While not an essential feature of this invention, it is preferred that the orifices 2, 3, and 4 be equipped with sleeves as illustrated extending upwardly from the orifice plate 1. The sleeves are of sufficient length above the plate up-stream from the flow of fluidized solids so that erosion of the sleeves may be tolerated without in any way affecting the operation of the valve. Thus, as fluidized solids flow to and through the orifices 2, 3, and 4, these solids will tend to erode the upper portions of the sleeves in a manner which will only reduce the height of the sleeve without affecting the size of the orifices. Little or no erosion of the vertical sides of the sleeves will occur as the flow of fluidized solids will be substantially parallel to these portions of the sleeves. It is not essential that the orifices or that the sleeves of the orifices be of the generally square shape illustrated; if desired they may be round, rectangular, triangular or may be of any other desired shape.

Referring to Figure 2, it will be apparent in considering the mechanism of the operation of the valve illustrated that as the slide 5 is moved towards the top of the drawing, this slide will first partially close orifice 4. As the movement of the slide is continued, this orifice may be completely closed by the slide and a different portion of the slide 5 will begin to close orifice 3. Similarly, on continued movement of the slide toward the top at the drawing, a still different section of the slide 5 will close the orifice 2. It is apparent that when the slide has been moved completely beneath the orifice plate 1, all orifices will be closed by the slide.

In considering the nature of erosion which will occur when using the slide valve illustrated, let it be assumed that the flow conditions to be maintained are such that it is necessary to control the flow by partial closure of orifice 4 as for example in the general relation of the slide 5 and orifice plate 1 which is illustrated in Figure 2. It will then be seen that a small portion of the slide 5 is directly exposed to the flow of fluidized solids passing through the orifice 4 where the slide 5 obstructs this orifice. As a consequence of this obstruction, particles will be caught on the flat portion of the slide obstructing the orifice, building up a layer of solid particles on this portion of the slide which will in large part protect this portion of the slide from erosion. However, erosion of the part of the edge of the slide obstructing orifice 4 and of the face of the slide immediately adjacent will occur due to passage of the solids through orifice 4 past the edge of the slide. If this erosion continues and assuming no change in the position of the slide 5, it is apparent that the effective opening through the orifice plate 1 and past the slide 5 will be increased. Consequently to maintain a given flow of fluidized solids, it is necessary to move the slide 5 towards the top at the drawing as erosion of the edge of the slide adjacent orifice 4 continues.

It is apparent that regardless of the extent of erosion by simply moving the slide 5 towards the top of the drawing any desired control of passage size through orifice 4 may be maintained at all times. When erosion of the slide 5 has proceeded to such an extent as to cut an opening in the slide substantially the size of the orifice 4 it will be observed that the slide will have reached such a position as to begin to close orifice 3. Further movement of the slide will permit continued use of the valve while erosion of the slide occurs along the edges of the slide 5 adjacent the orifices 3 and 4. It will be particularly observed that at any time positive closure of the valve is desired this may be obtained by moving the slide 5 completely over the orifices 2, 3, and 4. This movement will bring portions of the slide 5 across the orifices which have not hitherto been subjected to the action of the flow of fluidized solids, thus permitting and insuring complete closure of the valve.

Figure 3:
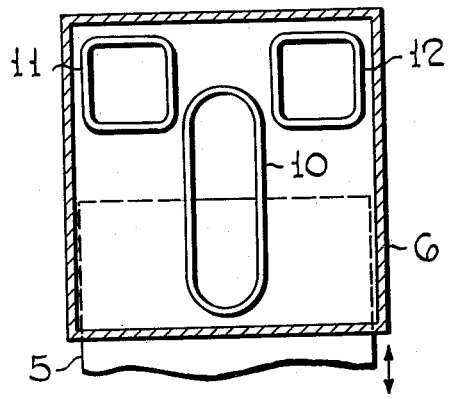

Referring now to Figure 3 of the drawing a somewhat different embodiment of this invention is illustrated in which three orifices 10, 11 and 12 are employed of a different size and placement from those illustrated in Figures 1 and 2. As all parts of the valve mechanism illustrated correspond to elements of the valve formerly described in Figure 1, the nature of this valve may be understood by reference to the numerals formerly identified. Again, in the embodiment of Figure 3 it will be observed that when erosion of the slide adjacent orifice 10 has rendered control of flow through this orifice uncertain, the slide 5 may be moved so as to expose fresh portions of the edge of the slide adapted to control the flow of the solids through orifices 11 and 12.

Figure 4:
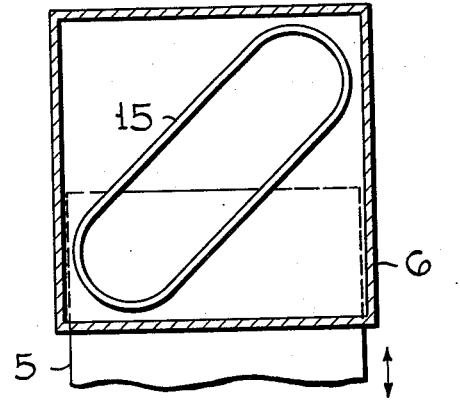
Figure 4 shows an embodiment of the invention utilizing a single orifice.

Finally referring to Figure 4 of the drawing a still further embodiment of this invention is illustrated in which a single elongated opening 15 is utilized. This opening is positioned in the orifice plate 1 so as to be non-parallel to the edge of the slide 5. Consequently movement of the slide 5 over this opening again serves to successively expose fresh portions of the slide to obstruct the opening.

In accordance with this invention therefore, slide valves are provided having an orifice plate equipped with at least one elongated opening and preferably two or more orifices. Using the direction of the movement of the slide 5 as a reference direction, a line drawn tangent to one of the orifices in the direction of movement of the slide will either be tangent to another of the orifices or will be somewhat removed therefrom so as not to touch the other of the orifices. Similarly a line drawn tangent to any of the orifices parallel to the edge of the slide 5 which moves across the orifices will preferably either be tangent to one or more of the other orifices or will not touch the other orifices at all. By positioning orifices as indicated, the portion of the edge of the slide 5 closing one of the orifices will be different from the portion of the edge of the slide closing any other of the orifices, thus making possible the successful operation of the valve under conditions of prolonged erosion as described.

Having now fully described this invention what is claimed is:

In a walled conduit adapted for the flow therethrough of a stream of fluidized finely divided solid particles, wherein said stream of particles is characterized by having the flow and hydrostatic properties of a liquid, and wherein the flow motion of individual solid particles in said stream tends to erode any obstruction interposed to control the flow of said stream through said conduit, a valve structure for controlling flow of said stream through said conduit comprising an orifice plate disposed transversely of said conduit and including a plate partition portion secured in said conduit so as to divide said conduit into upstream and downstream sections relative to flow through said conduit, wherein said plate has corresponding upstream and downstream surfaces, and a series of individual orifice plate extension portions joined at one end to the upstream surface of said orifice plate partition portion in perpendicular relation thereto, said extension portions extending from said upstream surface into said conduit upstream section in laterally spaced relation to the walls thereof and terminating in spaced relation upstream from said upstream partition surface, said orifice plate extension portions defining a series of orifice passageways of substantially uniform cross section in which series said orifice passageways are disposed in angularly offset, non-overlapping relation one to another, said orifice passageways opening at one end from said upstream conduit section upstream from said partition portion upstream surface, and at the other end opening through said orifice plate partition portion and the downstream surface thereof into said downstream conduit section, and a valve slide plate disposed in the downstream section of said conduit for reciprocal movement transversely thereof, said slide plate including an upstream surface portion in slidable contact with the downstream surface of said orifice plate partition portion, in which said slide plate upstream surface portion provides a series of integral adjoining coextensive surface sections, each of which is continuous in the direction of movement of said slide plate, said slide plate providing a leading edge continuous laterally across said surface sections and at right angles to the direction of movement of said slide plate, and wherein each of said surface sections corresponds to only one of said orifice passageways and is adapted to restrict flow through said corresponding passageway, whereby as said slide plate is moved across said orifice plate, that portion of the leading edge which is common to one of said sections intercepts flow through only one corresponding passageway, with such flow through each of said passageways being restricted in sequence from passageway to passageway in the direction of movement of said slide plate by a different section of said slide plate upstream surface, and erosion produced by the flow of solid particles through any one of said orifice passageways over the leading edge of said slide plate is limited to the one continuous surface section, and the leading edge portion common thereto, which is related to that orifice passageway alone.

References Cited in the file of this patent

UNITED STATES PATENTS

| Number | Name | Date |
| --- | --- | --- |
| 735,563 | Myers | Aug. 4, 1903 |
| 752,175 | Monnier | Feb. 16, 1904 |
| 977,723 | Field | Dec. 6, 1910 |
| 1,112,066 | Hollis | Sept. 29, 1914 |
| 1,926,413 | Tibbs | Sept. 12, 1933 |
| 1,938,475 | Alexander | Dec. 5, 1933 |
| 2,074,607 | Frey | Mar. 23, 1937 |